US008012534B1

(12) United States Patent  (10) Patent No.: US 8,012,534 B1
Ciaramitaro et al.  (45) Date of Patent: Sep. 6, 2011

(54) THERMOSETTING COATINGS FOR PARTICULATE MATERIALS AND METHODS OF APPLICATION

(75) Inventors: David A. Ciaramitaro, Ridgecrest, CA (US); Brian A. Zentner, Ridgecrest, CA (US); Andrew J. Lieux, Ridgecrest, CA (US); Anna R. Merritt, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 171 days.

(21) Appl. No.: 12/459,118

(22) Filed: Jun. 15, 2009

(51) Int. Cl.
B05D 7/00 (2006.01)
(52) U.S. Cl. ........... 427/212; 427/213.3; 427/213.33; 428/357; 428/402; 428/403; 525/88
(58) Field of Classification Search .............. 525/88; 428/357, 402, 403; 427/212, 213.3, 213.33
See application file for complete search history.

(56) References Cited

U.S. PATENT DOCUMENTS

| 6,197,883 | B1 * | 3/2001 | Schimmel et al. | 525/111 |
| 6,670,043 | B2 * | 12/2003 | Barkac et al. | 428/423.1 |
| 7,396,584 | B2 * | 7/2008 | Azad et al. | 428/327 |

* cited by examiner

Primary Examiner — J. Woodrow Eldred
(74) Attorney, Agent, or Firm — Brian F. Drazich; James M. Saunders

(57) ABSTRACT

A process is provided for coating particulate materials with a thermoset polymeric coating that is less prone to creep or abrasion than a thermoplastic coating. The process provides for the coating of water-reactive and water-soluble materials which require a non-aqueous media for processing and also provides for the coating of particulate materials which must be processed in water. Also, all organics may be recovered, and there is no solvent contamination of water. It is emphasized that this abstract is provided to comply with the rules requiring an abstract that will allow a searcher or other reader to quickly ascertain the subject matter of the technical disclosure. It is submitted with the understanding that it will not be used to interpret or limit the scope of the claims.

20 Claims, 4 Drawing Sheets

THERMOSETTING COATINGS FOR PARTICULATE MATERIALS AND METHODS OF APPLICATION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

Processes for coating particulate materials with thermosetting polymeric coatings.

BACKGROUND OF THE INVENTION

Conventionally, materials for coating particles are thermoplastics which are attached or adhered to the particles by a process involving immersion of particles in a solution of the thermoplastic material. A sufficient amount of the thermoplastic material to coat the particles is dissolved in a low-boiling point, water-immiscible solvent. The particles are suspended in water to form a slurry, and the solution of thermoplastic material is then added to the slurry. The resulting mixture is then stirred vigorously and slowly heated to drive off the solvent. As the solvent is removed, the water keeps the particles in the stirred suspension separated while the thermoplastic material is precipitated onto the surface of the particles. Finally, the coated particles are removed from the suspension by filtration and are dried.

Some disadvantages of the conventional coating method are: (1) The conventional thermoplastic coatings are subject to creep and abrasion, so their integrity may be compromised; (2) The solvents which dissolve thermoplastics may be toxic or otherwise environmentally undesirable; (3) Although most of the solvents can be recovered, trace amounts may remain to contaminate the water used as the suspension medium, necessitating its disposal as hazardous waste; and (4) The process may not be used to coat water-reactive materials.

The novel methods disclosed here overcome these disadvantages of conventional coating methods. In the disclosed methods, the particles to be coated are suspended in the presence of both an $N_3$-terminated compound, conventionally referred to as an azido-terminated compound, and an R—C≡C-terminated compound, conventionally referred to as an ethynyl-(acetylene-) terminated compound. The azido-terminated compound and the ethynyl-(acetylene-) terminated compound are both adsorbed, absorbed, bonded, or otherwise disposed on or coupled to the surface of a particle, such that the azido-terminations and the ethynyl-terminations may be caused to react together to form triazole ring structures. The triazole rings link the two compounds together to form a thermosetting polymer composition coating the surface of a particle. The azido-terminated compound and the ethynyl-(acetylene-) terminated compound of the disclosed embodiments may each be small molecules, or large molecules such as prepolymers, or oligomers.

In the disclosed embodiments, the particulates may be slurried in a liquid dispersion medium comprising an organic solvent, an organic nonsolvent, or water. Accordingly, the particulate material is slurried in one of these media, and stoichiometric amounts, or other predetermined amounts, of both the azido-terminated material and the ethynyl-terminated material are added to the slurry in quantities sufficient to cover the surface of all the particles (i.e., the total combined surface area of all of the particles), or to cover a predetermined proportion of the total surface area, following which the stirred slurry composition is heated, with or without catalysts, to a temperature sufficient to induce formation of triazoles by reaction of the azido-terminated material with the ethynyl-terminated material. The curing reaction of the organic compounds into a thermosetting polymer is continued until polymerization is complete to form a thermoset coating on the particles. Embodiments of these processes or methods provide: (1) a coating that is a thermoset polymeric coating, less prone to creep or abrasion than are thermoplastic coatings; (2) the particulate slurry may be formed in either organic solvent, organic nonsolvent, a combination of solvent and nonsolvent as the solubilities and polarities of the azido- and acetylenic-terminated materials require, or water; (3) all of the organics may be recovered, and there is no solvent contamination of water; (4) for the coating of water-reactive and water-soluble materials which require a non-aqueous media for processing; and (5) for the coating of sensitive and/or reactive materials which require an aqueous media for processing. Particulates amenable to coating as disclosed here include the wide variety of materials susceptible to suspension in an organic solvent, an organic non-solvent, or water, including by way of example only and without limitation, materials such as metals, metal compounds, alloys, energetic compounds, energetic compositions, and those materials upon which a conventional thermoplastic coating may be applied.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

Figure 1:
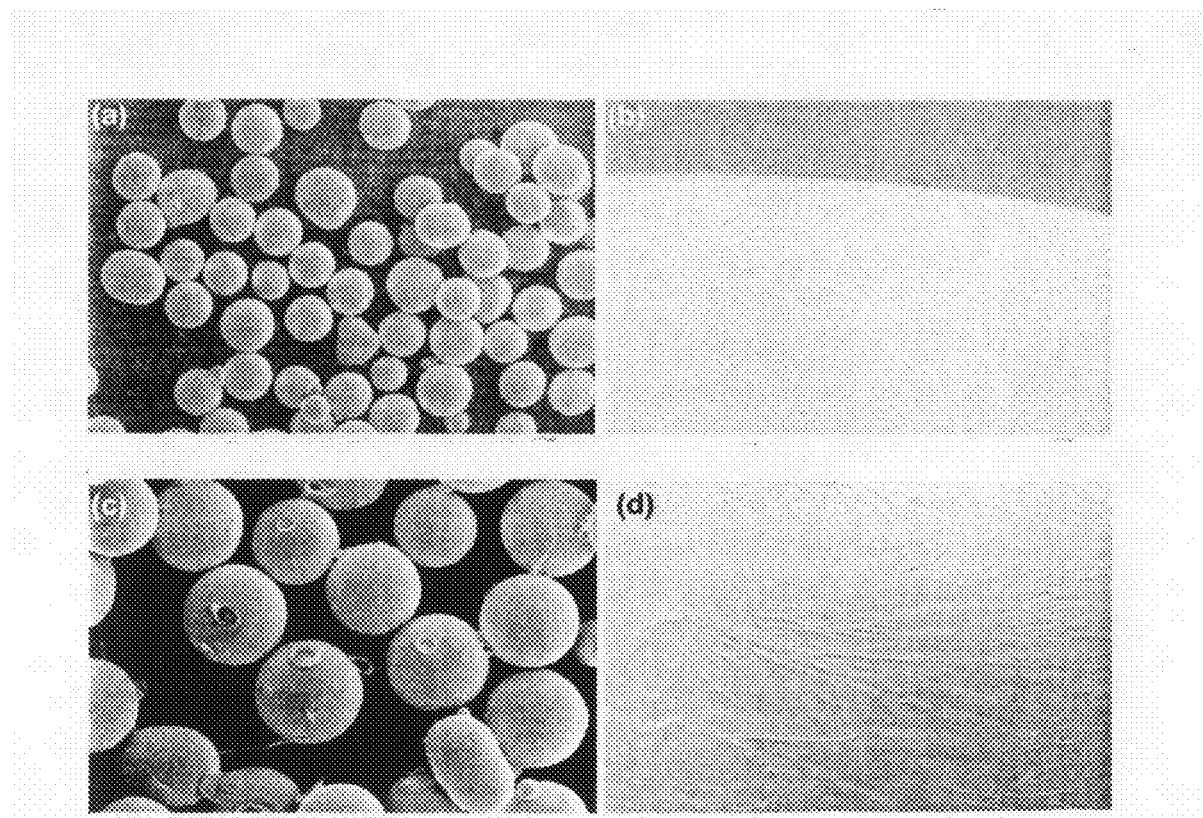
FIGS. 1a-1d of the drawings are photomicrographs of SEM images of glass beads uncoated (a) & (b) and coated in solvent with triazole polymer (c) & (d).

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS

Processes for coating particulate materials with a thermosetting polymeric coating are provided. In embodiments of the processes disclosed particles to be coated are maintained suspended and dispersed or separated from one another in a liquid by stirring or otherwise agitating a slurry. The stirred slurry contains an azido-terminated compound or compounds and an ethynyl-(acetylene-) terminated compound or compounds that have been dissolved, dispersed or otherwise solvated in the dispersion liquid in predetermined proportions and in sufficient amount to together substantially or entirely cover the surfaces of the particles. The temperature of the stirred slurry is adjusted to a predetermined value—typically in the range from about 50° C. to about 100° C.—at which the azido-terminal groups and the ethynyl-(acetylene-) terminal groups react together to form triazole rings which bond or link molecules of the two compounds together to form a thermosetting polymer coating on the surfaces of the particles. The temperature profile to which the slurry temperature is adjusted and the time for which it is maintained is based upon the physical properties and melting point of the particular particles to be coated as well as the particular azido-terminated compound(s) and an ethynyl-(acetylene-) terminated compound(s) chosen to coat the particles, together with the rate of the polymerization reaction as a function of temperature.

The azido-terminated compounds and the ethynyl-(acetylene-) terminated compounds may each be small molecules, or large molecules such as prepolymers, or oligomers. Azido-terminated compounds suitable for use include compounds such as, for example, ethers, esters, ketones, hydrocarbons, caprolactones and polymerized or copolymerized chains of these moieties; and hydroxylated, halogenated, nitrated, azido-substituted or otherwise derivatized versions of these compounds or their polymers. Acetylene-terminated compounds suitable for use include compounds such as, for example, ethers, esters, ketones, hydrocarbons, caprolactones and polymerized or copolymerized chains of these moieties; and hydroxylated, halogenated, nitrated, azido-substituted or otherwise derivatized versions of these compounds or their polymers. The azido-terminated and the ethynyl-(acetylene-) terminated compound(s) may be solid crystalline materials, or waxy, low melting solids, or liquids, that may be dissolved, dispersed or solvated in a liquid that does not dissolve or significantly alter the physical and/or chemical properties of the particles to be coated.

In the several embodiments disclosed, the particles or particulates (depending upon their physical and/or chemical properties) may be slurried in either an organic solvent, an organic nonsolvent, or in water. The term "solvent" as used here relates to the ability of the liquid phase to dissolve the precursors of the triazole polymer but not the triazole-cured polymer itself. Depending upon the precursors in question, water may be a solvent or nonsolvent as well. The organic solvents and organic nonsolvents may be aliphatic, alicyclic or aromatic hydrocarbons, ethers, esters, halogenated organics, alcohols or ketones. The preferred liquids for the slurry and for dissolving or solvating the azido-terminated and the ethynyl-(acetylene-) terminated compounds are water, alicyclic hydrocarbons and aromatic hydrocarbons, for their simplicity. The selection criteria for these liquids are: (1) the solubility or dispersibility in the solvent, nonsolvent, or water, of the triazole-forming azido-terminated and ethynyl-(acetylene-) terminated reactants; (2) the insolubility or very low solubility of the particles to be coated in the liquid; and, (3) a boiling point at or higher than a temperature sufficient to effect the triazole curing reaction. Hence, any organic liquid that dissolves or disperses the triazole-forming oligomers and curatives and that satisfies the aforesaid other criteria may be used in the various embodiments of the processes disclosed. An organic solvent that satisfies these criteria for a variety of particulates is the aromatic liquid hydrocarbon, toluene. Similarly, an organic nonsolvent that satisfies these criteria for a variety of particulates is methylcyclohexane.

In the various embodiments, selected particulate material is slurried in one of the three classes of liquid media or dispersion liquid described above. Stoichiometric, or otherwise appropriate, amounts of both the azido-terminated compound(s) and the ethynyl-terminated compound(s), each dispersed, dissolved, or solubilized in a liquid that is the same as the liquid used to slurry the particles, are then added to the slurry in quantities sufficient for the compounds to cover the surface of all the particles. The stirred slurry composition is then heated to a temperature sufficient to induce and support formation of triazole ring structures, and this crosslinking or curing of the azido-terminated and ethynyl-terminated compounds into a thermosetting polymer by formation of triazole ring structures is continued until polymerization is complete.

In the following examples, glass beads and polystyrene beads are used as models of a generic particulate material, to demonstrate and exemplify coating particulates as disclosed.

Example 1

175 mL of n-heptane and 122 mL of toluene was added to a 1 L round bottom flask equipped with a mechanical stirrer, thermocouple, reflux condenser, and nitrogen gas inlet and outlet and heating mantle. The solvent mixture was stirred at about 200-300 rpm and 60° C. for 10 min while $N_2$ was bubbled into the solvent/non-solvent dispersion solution. 10 g of glass beads (60-80 mesh) (or 6.67 g of ion-exchange resin beads (20-50 mesh)) were added to the reaction flask and the stirring was increased to at least about 500 rpm to disperse the beads in the solution phase; the nitrogen bubbler was then replaced with a nitrogen purge. 0.025 mmol of polycaprolactone-azidobutyrate ester (about 20,000 MW) dissolved in 50 mL of toluene was added to the reaction flask and the flask temperature was adjusted to 80° C. After addition of the polycaprolactone-azidobutyrate ester, 0.033 mmol of trimethylolethane tripropiolate (TMEoETP) dissolved in 3 mL of toluene was added to provide a 1:1 ratio of acetylene-to-azide (Ac:Az) functional groups to react with each other. The polymerization was carried out at 80° C. for about 4 hours or more under nitrogen with vigorous stirring. The stirring was carried out at about 500 rpm or higher, but any stirring rate that achieves maintaining the beads dispersed and suspended in the solution will suffice. After polymerization was complete the beads were allowed to settle to the bottom of the flask and the solvent was decanted; the polymer coated beads were recovered by spatula and were placed on filter paper to dry.

The glass beads were examined for coating under an optical and a scanning electron microscope. SEM images of uncoated and triazole-cured polymer coated glass beads are shown in FIG. 1. FIG. 1a and FIG. 1b are images of the uncoated glass beads at different magnifications. In FIG. 1b the surface of the glass beads is seen to be very smooth and featureless. FIG. 1c and FIG. 1d are images of the glass beads after the dispersion polymerization process. The round defects in the coating seen in FIG. 1c are a result of the contact between beads which dented or perhaps partially removed the coating upon particle separation or before polymerization was complete, but allow visualization of the coating and its thickness. FIG. 1d is an image of the bead surface which displays the morphology of the triazole polymer. Notably the uncoated glass bead depicted in FIG. 1b, which is at the same magnification as FIG. 1d, shows an absence of any such morphology.

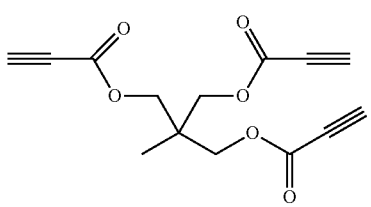

Trimethylolethane Tripropiolate

Figure 2:
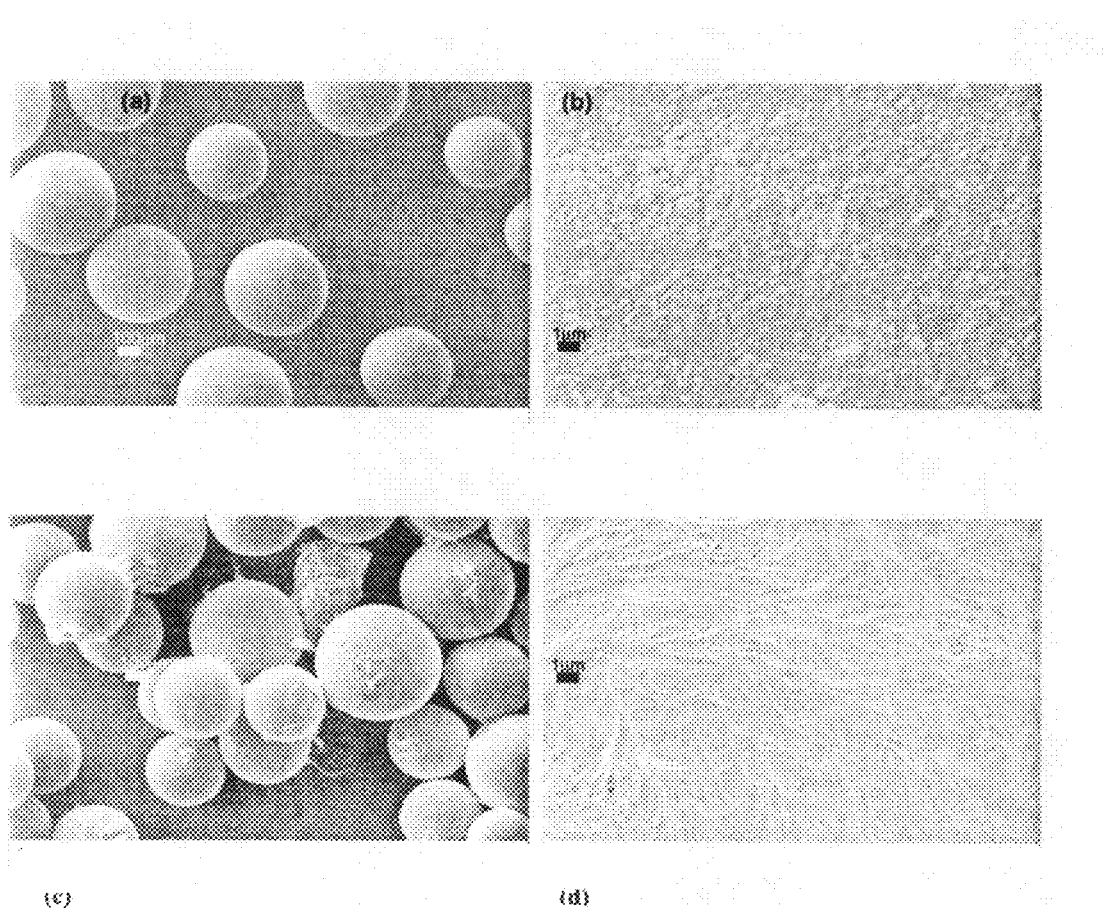
FIGS. 2a-2d of the drawings are photomicrographs of SEM images of ion-exchange resin beads uncoated (a) & (b) and coated in solvent with triazole polymer (c) & (d).

The generality of these triazole coating methods was also demonstrated by the usage of a second particulate substrate. Ion-exchange resin beads were selected as a second model substrate. The triazole-polymer coating process also results in thin and uniform coatings of triazole polymers on the ion-exchange resin beads as shown by the SEM images in FIG. 2. FIG. 2a and FIG. 2b are images of the uncoated, ion-exchange resin beads at different magnifications. In FIG. 2b the surface of the beads is seen to be rough, with varying densities of raised surface moieties. FIG. 2c and FIG. 2d are images of the ion-exchange resin beads after the dispersion polymerization process. Again, the defects in the coating seen in FIG. 2c are a result of the contact between beads as described above. FIG. 2d is an image of the bead surface which displays the morphology of the triazole polymer.

In these two particular coating experiments which utilized an organic solvent/non-solvent as the dispersion liquid, the ratio of the toluene solvent to the n-heptane non-solvent was 50:50 by volume. This ratio was sufficient to adjust the polarity of the solvent mixture so that the triazole pre-polymers were soluble in the dispersion media while the triazole-cured polymers were insoluble. It is noted that any homogeneous organic solvent system with a similar polarity as the n-heptane and toluene mixture, and that does not dissolve the particles, could be substituted as the dispersion liquid with similar results.

Example 2

Figure 3:
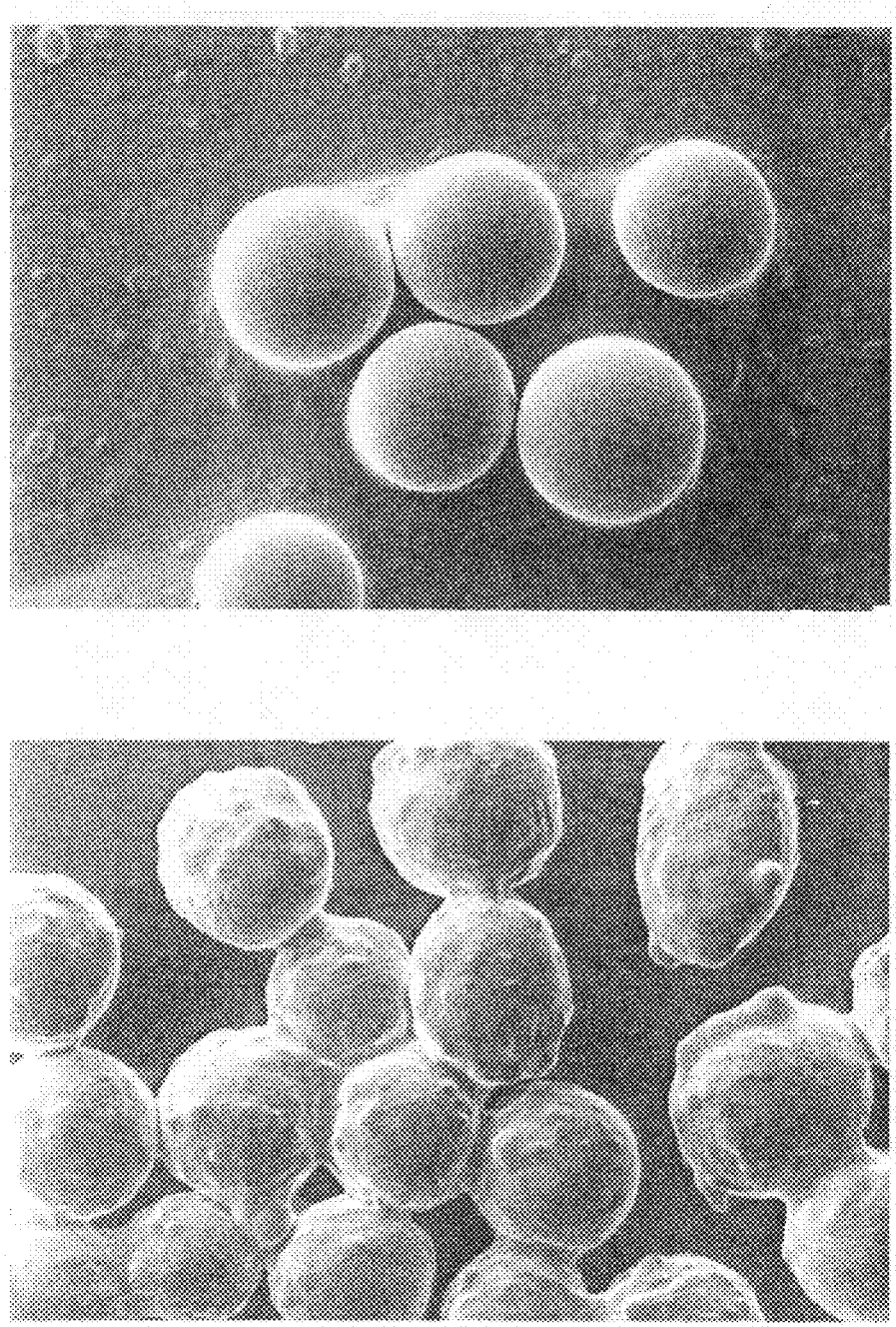
FIG. 3 of the drawings is a photomicrograph of glass beads (top) uncoated and (bottom) after nonsolvent triazole coating.

In the same manner, 10 gm of glass beads were coated with polyethylene glycol azidobutyrate ester oligomer (Mole.Wt. about 7000 to about 9000) (polyethylene glycol available as Pluracol E8000 from BASF Corp., Mt. Olive, N.J.) in 500 ml of methylcyclohexane (dispersion liquid). The oligomer (3 gm) and trimethylolethane tripropiolate curative (0.224 gm) in a 1:1 Ac:Az ratio was stirred as rapidly as necessary to disperse the beads in the solution and was maintained at 100° C. under nitrogen for 5 days and nights or until visible signs of precipitation occurred. Again, the glass beads were checked for coating under optical and scanning electron microscope. Before and after pictures of the glass beads are shown in FIG. 3.

Example 3

Figure 4:
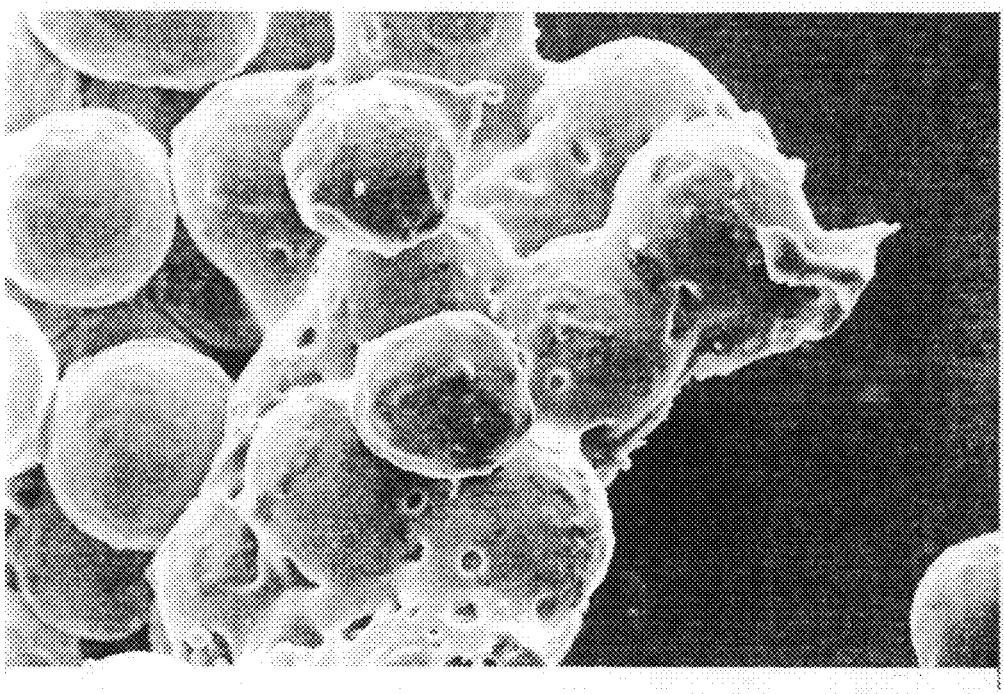
FIG. 4 of the drawings is a photomicrograph of glass beads coated in water via triazole polymerization.

In the same manner as above, 10 gm of glass beads were placed in 500 ml of water with 3 gm of azidoester oligomer and 0.067 gm trimethylolethane tripropiolate curative in a 1:1 ratio of Ac:Az. The slurry was stirred as rapidly as necessary to disperse the beads in the solution and was maintained at 100° C. under nitrogen for 5 days and nights or until visible signs of precipitation occurred. The glass beads were checked for coating under optical and scanning electron microscopes as before. Coated glass beads coated in water via triazole polymerization are shown in FIG. 4. In the water solutions cucurbiturils (n=5-8, 10) may be used as a catalyst. This material appeared to cause slightly more precipitation of the polymer on the glass beads.

In the same manner, 10 gm of glass beads were stirred in 350 ml of toluene, and polyethylene glycol azidoester oligomer and trimethylolethane tripropiolate curative were added in a 1:1 cure ratio. The mixture was stirred as rapidly as necessary to disperse the beads in the solution and was maintained under nitrogen for 5 days and nights or until visible evidence of coating or precipitation occurred.

Upon heating the to the required temperature, a polymerization reaction takes place in the stirred slurry containing the particulate material coated with the azido-terminated compound(s) and the ethynyl-(acetylene) terminated compound (s). As shown in Diagram 1, the ethynyl (acetylene) function of substituted $R_1$ organic molecules and the azido function of substituted $R_2$ organic molecules react to rearrange into a triazole ring structure which links the $R_1$ and $R_2$ moieties together thereby forming a thermoset polymeric coating on the surface of the particles. It will be noted that no byproduct is given off in this reaction—all the atoms rearrange into the linking triazole ring structure.

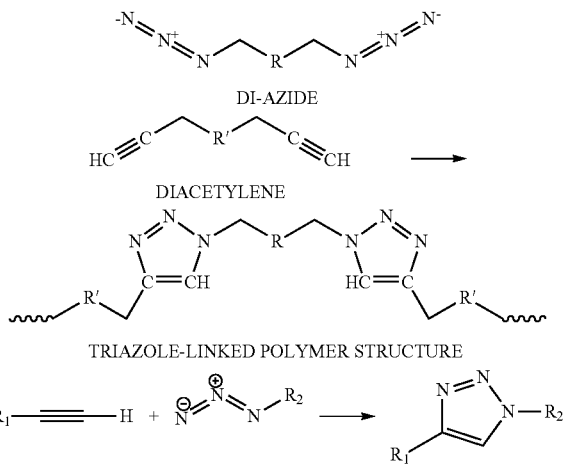

Diagram 1

Further as to Diagram 1, $R_1$ includes, but is not limited to, may be an ether, ester, ketone, hydrocarbon, caprolactone and polymerized or copolymerized chains of ethers, esters, ketones, hydrocarbon, or caprolactones as well as hydroxylated, halogenated, nitrated, azido-substituted or otherwise derivatized versions of ethers, esters, ketones, hydrocarbon, caprolactones or their polymers. Additionally, $R_1$ may be substituted with multiple acetylenics. Moreover, and independently of $R_1$ to the extent that $R_1$ and $R_2$ are each soluble in the same organic solvent, organic nonsolvent, or water, $R_2$ may be an ether, ester, ketone, hydrocarbon, caprolactone and polymerized or copolymerized chains of ethers, esters, ketones, hydrocarbons, or caprolactones as well as hydroxylated, halogenated, nitrated, azido-substituted or otherwise derivatized versions of ethers, esters, ketones, hydrocarbons, or caprolactones or their polymers. What is more, $R_2$ may be substituted with multiple azido functions.

$R_1$ moieties substituted with multiple acetylenics may react with $R_2$ moieties substituted with multiple azides to form large structures of particulate material linked together with the triazole rings, or "cured," into a solid rubbery mass.

Finally, residual moisture in the solvents or nonsolvents does not interfere with the reaction of the process.

After coating of the particles is complete, the slurry of coated particles and solvent, nonsolvent, solvent/nonsolvent and water is allowed to cool to room temperature with stirring. Stirring is then stopped and the particles are separated from the liquid by filtration. The liquid phase can be reused as-is, since the elements of the coating reaction have precipitated onto the particles.

While what are presently considered to be the most practical embodiments have been described, it is to be understood that the invention is not to be limited to the disclosed embodiments, but to the contrary, is intended to cover various modifications, embodiments, and equivalent processes included within the spirit of the invention as may be suggested by the teachings herein, which are set forth in the appended claims, and which scope is to be accorded the broadest interpretation so as to encompass all such modifications, embodiments, and equivalent processes.

What is claimed is:

1. A process for coating particles with a thermosetting composition comprising:
   suspending particles in a liquid to form a first slurry;
   mixing predetermined amounts of an azido-terminated first compound and an ethynyl-(acetylene-) terminated second compound with said first slurry to form a second slurry of particles having a mixture of azido-terminated first compound and ethynyl-(acetylene-) terminated second compound disposed on the surface of each particle; and
   stirring said second slurry at a predetermined temperature for a predetermined time to allow substantially complete reaction of the azido-termination groups of the first compound with the ethynyl-(acetylene-) termination groups of the second compound to form triazole ring structures linking molecules of the first compound with molecules of the second compound to form a thermoset polymeric coating on the surface of each particle.

2. A thermoset polymer coated particle prepared by the process of claim 1.

3. The process of claim 1 wherein the amount of azido-terminated first compound together with the amount of ethynyl-(acetylene-) terminated second compound is sufficient to cover the surface of each particle.

4. The process of claim 1 wherein the amount of azido-terminated first compound together with the amount of ethynyl-(acetylene-) terminated second compound is sufficient to cover a predetermined proportion of the total surface area of the particles.

5. The process of claim 1 wherein the amount of azido-terminated first compound and the amount of ethynyl-(acetylene-) terminated second compound is selected to provide predetermined proportions of said first compound and said second compound on the surface of each particle.

6. The process of claim 1 wherein the liquid comprises at least one of aromatic hydrocarbon, ether, ester, halogenated hydrocarbon, alcohol, and ketone.

7. The process of claim 1 wherein the liquid comprises at least one of aliphatic hydrocarbon and alicyclic hydrocarbon.

8. The process of claim 1 wherein the liquid comprises at least one of toluene, methylcyclohexane, and water.

9. The process of claim 1 wherein the azido-terminated first compound comprises at least one of azido-terminated ether, azido-terminated ester, azido-terminated ketone, azido-terminated caprolactone, and azido-terminated hydrocarbon.

10. The process of claim 1 wherein the azido-terminated first compound comprises at least one of azido-terminated polymer of an ether, azido-terminated polymer of an ester, azido-terminated polymer of a ketone, azido-terminated polymer of a caprolactone, and azido-terminated polymer of a hydrocarbon.

11. The process of claim 1 wherein the azido-terminated first compound is an azido-terminated co-polymer of monomers comprising at least one of ether, ester, ketone, caprolactone, and hydrocarbon.

12. The process of claim 1 wherein the azido-terminated first compound is substituted with at least one of hydroxyl, halogen, nitrate, and azido.

13. The process of claim 1 wherein the azido-terminated first compound is comprised of a derivative of an ether, an ester, a ketone, a caprolactone, or a hydrocarbon.

14. The process of claim 1 wherein the ethynyl-(acetylene-) terminated second compound further comprises at least one of ethynyl-(acetylene-) terminated ether, ethynyl-(acetylene-) terminated ester, ethynyl-(acetylene-) terminated ketone, ethynyl-(acetylene-) terminated caprolactone, and ethynyl-(acetylene-) terminated hydrocarbon.

15. The process of claim 1 wherein the ethynyl-(acetylene-) terminated second compound is an ethynyl-(acetylene-) terminated polymer further comprising at least one of ethynyl-(acetylene-) terminated polymer of an ether, ethynyl-(acetylene-) terminated polymer of an ester, ethynyl-(acetylene-) terminated polymer of a ketone, ethynyl-(acetylene-) terminated polymer of a caprolactone, and ethynyl-(acetylene-) terminated polymer of a hydrocarbon.

16. The process of claim 1 wherein the ethynyl-(acetylene-) terminated second compound is an ethynyl-(acetylene-) terminated co-polymer of monomers further comprising at least one of ether, ester, ketone, caprolactone, and hydrocarbon.

17. The process of claim 1 wherein the ethynyl-(acetylene-) terminated second compound is substituted with at least one of hydroxyl, halogen, nitrate, and azido.

18. The process of claim 1 wherein the ethynyl-(acetylene-) terminated second compound is a derivative further comprising at least one of an ether, an ester, a ketone, a caprolactone, and a hydrocarbon.

19. The process of claim 1 wherein the predetermined temperature is in the range from about 50° C. to about 100° C.

20. The process of claim 1 wherein the liquid is water further including a cucurbituril catalyst.

* * * * *